US009571656B2

(12) United States Patent
Barinov

(10) Patent No.: US 9,571,656 B2
(45) Date of Patent: *Feb. 14, 2017

(54) METHOD OF DISTRIBUTED AGGREGATION IN A CALL CENTER

(71) Applicant: Genesys Telecommunications Laboratories, Inc., Daly City, CA (US)

(72) Inventor: Vitaly Y. Barinov, Clayton, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,402

(22) Filed: Oct. 26, 2015

(65) Prior Publication Data

US 2016/0142547 A1    May 19, 2016

Related U.S. Application Data

(63) Continuation of application No. 14/444,907, filed on Jul. 28, 2014, now Pat. No. 9,172,804, which is a continuation of application No. 13/606,792, filed on Sep. 7, 2012, now Pat. No. 8,792,633.

(51) Int. Cl.
*H04M 3/00* (2006.01)
*G06F 15/16* (2006.01)
*H04M 3/523* (2006.01)
*H04M 3/51* (2006.01)

(52) U.S. Cl.
CPC ............ *H04M 3/5234* (2013.01); *H04M 3/51* (2013.01); *H04M 2203/40* (2013.01); *H04M 2203/402* (2013.01)

(58) Field of Classification Search
CPC .. H04M 3/5175; H04M 3/523; H04M 3/5158; H04M 3/5232; H04M 3/5183; H04M 3/5237; H04L 67/02; H04L 67/10; H04L 45/02; H04L 45/74; H04L 45/00; H04L 61/1511
USPC ............ 379/265.01–265.02, 266.07, 266.04; 709/218, 238
See application file for complete search history.

(56) References Cited

U.S. PATENT DOCUMENTS

| | | | |
|---|---|---|---|
| 5,937,051 | A | 8/1999 | Hurd et al. |
| 6,021,428 | A | 2/2000 | Miloslavsky |
| 6,055,308 | A | 4/2000 | Miloslavsky et al. |
| 6,134,315 | A | 10/2000 | Galvin |
| 6,377,567 | B1 | 4/2002 | Leonard |

(Continued)

FOREIGN PATENT DOCUMENTS

EP    2306381 A1    4/2011

OTHER PUBLICATIONS

"Hyper-graph", Wikipedia, http://en.wikipedia.org/wiki/Hypergraph, as captured on Mar. 29, 2013, 8 pages.

(Continued)

*Primary Examiner* — Rasha Al Aubaidi
(74) *Attorney, Agent, or Firm* — Lewis Roca Rothgerber Christie LLP

(57) ABSTRACT

A method for partitioning a call center having N agents associated with M agent groups, for computation by a plurality of computational nodes, has steps for (a) assigning each agent as a vertex in a hypergraph; (b) assigning each agent group as a hyper-edge in the hypergraph; and (c) applying a hypergraph partitioning algorithm to partition the agents and groups relative to the nodes with the hypergraph cost function awarding equal load distribution to nodes and minimizing inter-node traffic.

16 Claims, 4 Drawing Sheets

(56) References Cited

U.S. PATENT DOCUMENTS

| | | |
|---|---|---|
| 6,393,472 B1 | 5/2002 | Anerousis et al. |
| 6,404,883 B1 | 6/2002 | Hartmeier |
| 6,625,139 B2 | 9/2003 | Miloslavsky et al. |
| 6,650,748 B1 | 11/2003 | Edwards et al. |
| 6,834,303 B1 | 12/2004 | Garg et al. |
| 6,868,152 B2 | 3/2005 | Statham et al. |
| 6,879,586 B2 | 4/2005 | Miloslavsky et al. |
| 6,985,943 B2 | 1/2006 | Deryugin et al. |
| 7,376,227 B2 | 5/2008 | Anisimov et al. |
| 7,490,145 B2 | 2/2009 | Sylor et al. |
| 7,526,540 B2 | 4/2009 | Gopisetty et al. |
| 7,602,725 B2 | 10/2009 | Vaught |
| 7,701,925 B1 | 4/2010 | Mason et al. |
| 7,817,796 B1 | 10/2010 | Clippinger et al. |
| 7,936,867 B1 | 5/2011 | Hill et al. |
| 8,023,637 B2 | 9/2011 | Irwin et al. |
| 8,031,860 B2 | 10/2011 | Coussement |
| 8,146,000 B1 | 3/2012 | Boliek et al. |
| 8,391,463 B1 | 3/2013 | Kiefhaber et al. |
| 8,510,807 B1 | 8/2013 | Elazary et al. |
| 8,588,398 B1 | 11/2013 | Irwin et al. |
| 8,594,306 B2 | 11/2013 | Laredo et al. |
| 8,630,399 B2 | 1/2014 | D'Arcy et al. |
| 8,634,541 B2 | 1/2014 | Flockhart et al. |
| 8,675,859 B2 | 3/2014 | Mandalia et al. |
| 8,701,128 B2 | 4/2014 | Salt et al. |
| 8,719,067 B2 | 5/2014 | Fama et al. |
| 8,792,633 B2 | 7/2014 | Barinov |
| 9,172,804 B2 | 10/2015 | Barinov |
| 2002/0046273 A1 | 4/2002 | Lahr et al. |
| 2002/0095462 A1 | 7/2002 | Beck et al. |
| 2002/0110113 A1 | 8/2002 | Wengrovitz |
| 2002/0156599 A1 | 10/2002 | Oosthoek et al. |
| 2003/0018702 A1 | 1/2003 | Broughton et al. |
| 2003/0115317 A1 | 6/2003 | Hickson et al. |
| 2003/0198183 A1 | 10/2003 | Henriques et al. |
| 2004/0028212 A1 | 2/2004 | Lok et al. |
| 2004/0044585 A1 | 3/2004 | Franco |
| 2004/0088315 A1 | 5/2004 | Elder et al. |
| 2004/0252822 A1 | 12/2004 | Statham et al. |
| 2005/0154637 A1 | 7/2005 | Nair et al. |
| 2005/0210262 A1 | 9/2005 | Rolia et al. |
| 2006/0159027 A1 | 7/2006 | Owens |
| 2007/0226239 A1 | 9/2007 | Johnson et al. |
| 2008/0077470 A1 | 3/2008 | Yamanaka |
| 2008/0225804 A1 | 9/2008 | Thubert et al. |
| 2009/0271529 A1 | 10/2009 | Kashiyama et al. |
| 2009/0316687 A1 | 12/2009 | Kruppa |
| 2010/0002863 A1 | 1/2010 | Loftus et al. |
| 2010/0020689 A1 | 1/2010 | Tang |
| 2010/0106710 A1 | 4/2010 | Nishizawa et al. |
| 2010/0250566 A1 | 9/2010 | Paul |
| 2011/0055122 A1 | 3/2011 | Andreoli |
| 2011/0119761 A1 | 5/2011 | Wang et al. |
| 2011/0227754 A1 | 9/2011 | Hill |
| 2011/0254732 A1 | 10/2011 | Martin et al. |
| 2011/0283000 A1 | 11/2011 | McCormack et al. |
| 2012/0079061 A1 | 3/2012 | Krebs |
| 2012/0158995 A1 | 6/2012 | McNamee et al. |
| 2013/0050199 A1 | 2/2013 | Chavez |
| 2013/0204959 A1 | 8/2013 | Zhang et al. |
| 2014/0126711 A1 | 5/2014 | Barinov |
| 2014/0126713 A1 | 5/2014 | Ristock et al. |
| 2014/0129617 A1 | 5/2014 | Barinov |
| 2014/0143294 A1 | 5/2014 | Vitaly |
| 2014/0143373 A1 | 5/2014 | Vitaly |

OTHER PUBLICATIONS

Han, J., et al., Data Mining: Concepts and Techniques, 2nd edition, Morgan Kaufmann Publishers, Mar. 2006, 772 pages.

Karypis, et al., Multilevel Hypergraph Partitioning: Applications in VLSI Domain, IEEE Transactions on Very Large Scale Integration (VLSI) Systems, vol. 7, No. 1, Mar. 1999, pp. 69-79.

Zoltan Developer's Guide: Quality Program; Zoltan Toolkit, http://www.cs.sandia.gov/zoltan/dev_html/dev_intro_sqe._html, as captured on Mar. 29, 2013, 6 pages.

Han, J. and Kamber, M. "Data Mining: Concepts and Techniques", 2nd Edition., Morgan Kaufmann Publishers, Mar. 2006, (136 pages).

Abadi, Daniel, "Problems with CAP, and Yahoo's little known NoSQL system", http://dbmsmusings.blogspot.com/2010/04/problems-with-cap-and-yahoos-little.html, (4 pages).

Anisimov, Nikolay et al., XML Based Framework for Contact Center Applications; WEBIST 2007—International Conference on Web Information Systems and Technologies, 2007, 8 pages.

Arasu, A., Widom, J. "Resource Sharing in Continuous Sliding-Window Aggregates", Proceedings of the 30th VLDB Confernece, Toronto, Canada 2004, (24 pages).

Birman, Kenneth P. et al., Exploiting Virtual Synchrony in Distributed Systems, Cornell University, ACM, 1987, pp. 123-138.

Cormode, G., et al., "Brief Announcement: Tracking Distributed Aggregates over Time-based Sliding Windows", PODC'11, Jun. 6-8, 2011, San Jose, California, USA, ACM 978-1-4503-0719—Feb. 11 2006, (2 pages).

Gilbert, S., and Lynch, N., "Brewer's Conjecture and the Feasibility of Consistent, Available, Partition-Tolerant Web Services", ACM SIGACT News, vol. 33 Issue 2 (2002), 51-59 (12 pages).

International Search Report and Written Opinion for PCT/US2013/071104, dated Feb. 27, 2014, 12 pages.

Lamport, Leslie, "Paxos Made Simple", ACM SIGACT News (Distributed ComputingColumn) 32, 4 (Whole No. 121, Dec. 2001), pp. 51-58 (14 pages).

Li, J et al., "No Pane, No Gain: Efficient Evaluation of Sliding-Window Aggregates over Data Streams", SIGMOD Record, vol. 34, No. 1, Mar. 2005, pp. 39-44 (6 pages).

Madden, S. et al. "TAG: a Tiny AGgregation Service for Ad-Hoc Sensor Networks", ACM SIGOPS Operating Systems Review—OSDI '02: Proceedings of the 5th symposium on Operating systems design and implementation, vol. 36 Issue SI, Winter 2002, 131-146 (16 pages).

Tanenbaum, Andrew S., Computer Networks, Fourth Edition, 2003, Prentice Hall PTR, 4 pages.

METHOD OF DISTRIBUTED AGGREGATION IN A CALL CENTER

CROSS-REFERENCE TO RELATED APPLICATIONS

This application is a continuation of U.S. patent application Ser. No. 14/444,907, filed on Jul. 28, 2014, now U.S. Pat. No. 9,172,804, which is a continuation of U.S. patent application Ser. No. 13/606,792, filed on Sep. 7, 2012, now U.S. Pat. No. 8,792,633, the contents of all of which are incorporated herein by reference.

BACKGROUND OF THE INVENTION

1. Field of the Invention

This invention is in the technical area of call centers, and pertains more particularly to creating statistics for a call center.

2. Description of Related Art

Call centers are typically organizations of telephone switches, computerized servers and agent stations inter-related by networks. The telephone switches are typically connected to Publically Switched Telephone Networks (PSTN), cellular telephone networks, and the Internet (for data-packet telephony). In a local call center most stations and computerized resources are inter-connected by a local area network (LAN), but there may also be more remote hardware and software resources, and agents as well inter-facing by a wide area network, which may be the well-known Internet network.

Call center technology is a rapidly-growing field, and has been so for some time, so modern call centers can be very large organizations, encompassing hundreds or even thousands of agents manning agent stations, and handling tens of thousands of calls.

In operation of call centers it is vitally important to have at least near real-time information concerning the state of resources, such as agent activity and availability, calls in queue, and much more. This information is used to plan resource adjustment, pace operations and to enable many other functions.

In most call centers there is therefore an operation termed Stat-Server in the art, which is a term used to refer to a computerized server appliance, or a group of such appliances, network connected to the agent stations and many other servers inter-related in the call center. The Stat Server executes powerful software from a non-transitory physical medium, and the software provides functionality for accepting data from many other points in the call center, monitors many call center functions and status, and performs highly-structured computerized operations to maintain and report statistics and status of a wide variety of call center functions in near real time. These status reports and statistics are vital in operation of any call center, which would quickly fail without such functions.

It was described above that call centers have evolved to a point that a single call center may have thousands of agents and may handle tens of thousands of calls. Moreover, there are federations of call centers, interfaced, for example, over the Internet, and the trend is to ever larger and larger operations.

In earlier days of call center technology, where a call center might have, for example twenty agent stations, manned by agents to handle perhaps a few hundred calls per day, a Stat Server having a single processing unit (node) and moderate computer power, was adequate to provide the information needed to operate the call center successfully. With the present state of call center technology, parallel processing (multiple nodes) and quite sophisticated software is more and more necessary to provide the real-time information and data needed for successful operation.

With multiple node parallel processing, and the complicated structure of call centers and their complicated functionality, partitioning a call center for parallel processing becomes a necessity, and brings new problems, one of which is inter-node data traffic, which severely limits the real-time desire of Stat Server operations.

What is clearly needed are methods for partitioning that limit inter-node traffic and provide real time operation with minimum computing power.

BRIEF SUMMARY OF THE INVENTION

In an embodiment of the present invention a method for partitioning a call center having N agents associated with M agent groups, for computation by a plurality of computational nodes is provided, having steps for (a) assigning each agent as a vertex in a hypergraph; (b) assigning each agent group as a hyper-edge in the hypergraph; and (c) applying a hypergraph partitioning algorithm to partition the agents and groups relative to the nodes with the hypergraph cost function awarding equal load distribution to nodes and minimizing inter-node traffic.

In another embodiment there are further steps for (d) mapping each agent and group as an object O to one of K nodes by a Hash function $H:O \to [1,K]$, such that each node $H(O)$ is an owner for the object; (e) for each agent, computing the aggregates $AA\_1, \ldots, AA\_P$ locally by the associated owner node; and (f) computing aggregates $AA\_1$, $AA\_P$ for each group shared by all K nodes by i) creating a partial state record (PSR) of the aggregates $AG\_j$ by Node i by aggregating on all agents, owned by node i and belonging to group G; and ii) sending PSRs to owner (G), which combines all PSRs into a total state record.

DETAILED DESCRIPTION OF THE INVENTION

Figure 1:
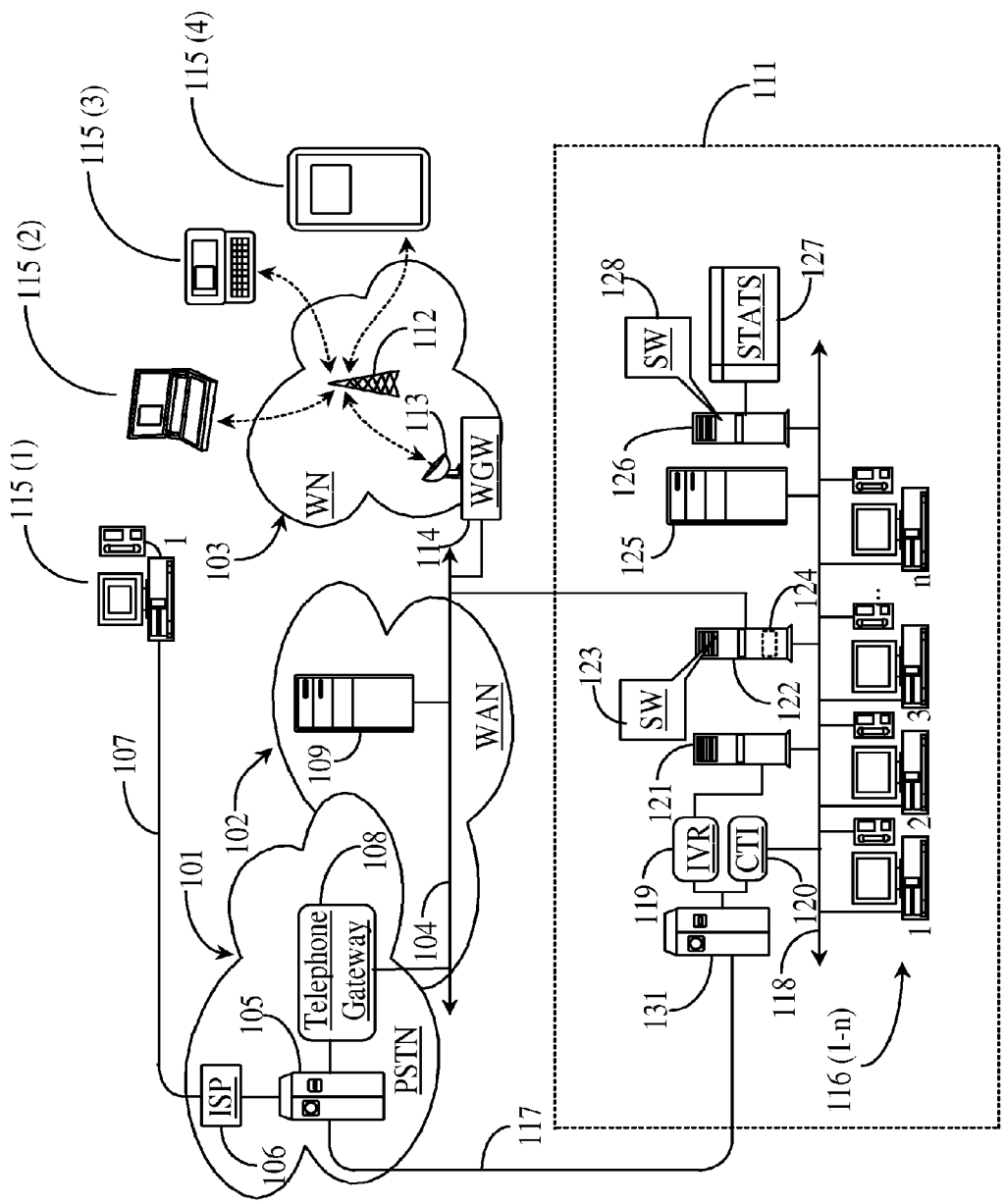
FIG. 1 is an exemplary architectural diagram of a network-connected system that includes a call center in an embodiment of the present invention.

FIG. 1 is an exemplary architectural diagram of a network-connected system that includes a call center 111 in an embodiment of the present invention. It is to be noted that this architecture is an example, and there are many perturbations that might be made. It is also to be noted that there may be several more call centers sharing traffic and distributing calls to agents, all under the purview of a single Stat Server 126 operation. This exemplary system comprises a wide-area-network (WAN) 102, a public-switched telephone network (PSTN) 101, and a wireless carrier network (WN)

103. PSTN 101 may be any publicly switched telephone network. WAN 102 may be a corporate or public WAN, and may be the well-known Internet network. Wireless network 103 may be any wireless carrier network and is typically a cellular telephony network.

WAN 102 is the Internet network in a preferred embodiment because of its high public access characteristic, and is referred to herein as Internet 102. Internet 102 is further exemplified by a network backbone 104 representing all of the lines, equipment, and connection points that make up the Internet as a whole. Therefore, there are no geographic limitations to the practice of the present invention.

Network backbone 104 in this example supports a web server 109, which may be hosted by any one of a wide variety of enterprises or organizations, and represents all web servers that may be instantiated in the Internet.

A call center 111 is illustrated in this example, built upon a local area network (LAN) 118 supporting various equipment and facilities for practicing call-center interaction processing. LAN 118 supports a plurality of call center agents dedicated to services for the host of the call center. Each call center agent in this example operates from an agent station 116 (1-*n*). Each agent station 116 (1-*n*) includes a LAN-connected computing appliance and a switch-connected telephone for illustrative purposes only, as the exact equipment types and operation may vary. The telephone capability at agent stations may be provided through the LAN as digital telephony, as shown in this example, or the telephones may be connected by Destination Number lines (not shown) to a PSTN switch connected, as is switch 131, to PSTN 101 by trunk 117.

PSTN 101 includes a network-level telephone switch 105, which may be an automated call distributor (ACD) or a private branch exchange (PBX), or some other type of telephony switching facility without departing from the spirit and scope of the present invention. Telephone switch 105 is connected to central office telephone switch 131 associated with the call center via telephony trunk 117. Switch 131 represents the last hop for callers before being routed to agent stations 116 (1-*n*) via telephone. Switch 105 in PSTN 101 has connection to network backbone 104 of the Internet network through a telephone gateway 108. Gateway 108 is adapted by software executing from a physical medium to facilitate cross conversion of telephony traffic from the PSTN to the Internet network and from the Internet over the PSTN network.

A variety of consumer appliances 115 (1-4) are illustrated in this example and are meant to include any appliances that may be used to access networks 102, 101, and 103. Appliance 115 (1) is a desktop computing appliance with a digital telephone and SW executing to enable the telephone. In an alternative embodiment the telephone may be a separate PSTN telephone connected by PSTN land-line to PSTN network 101.

A consumer operating equipment 115 (1) connects with computer 115 (1) to Internet 102 via PSTN land line 107, and an Internet service provider (ISP) 106, in this instance through gateway 108. The methods of connection may vary upon the equipment used and the available technical avenues for accessing the Internet. Cable modem, telephone modem, satellite, digital services line (DSL), broadband, and WiFi are just some of the available connection methods that may be used to gain access to Internet 102.

Consumer appliances 115 (2), 115 (3) and 115 (4) are wirelessly enabled to connect to network backbone 104 via a cell tower 112, a transceiver 113, and a wireless multimedia gateway (WGW) 114 for bridging communications between wireless network 103 and Internet 102. Consumer appliance 115 (2) is a Laptop computer and 115 (3) is a cellular telephone, such as an iPhone or an Android telephone. Computing appliance 115 (4) is an iPad type device. It may be assumed in this example, that each of the users operating appliances 115 (1-4) may initiate and manage telephone calls, multi-media transactions, emails, and web-browsing sessions.

LAN 118 in call center 111 supports a routing server 122 connected to Internet backbone 104 by way of an Internet access line. Routing server 122 includes a physical digital medium 124 that stores all of the data and software required to enable interaction routing. All transaction requests made by users from appliances 115 (1-4) are sent to routing server 122 for distribution to agents operating at agent stations 116 (1-*n*), managed by routing software that may employ many intelligent routing functions. Telephone switch 131 is enhanced for intelligent routing of voice interactions via a computer telephony integration (CTI) processor 120. CTI processor 120 is connected to switch 131 via a CTI link. CTI processor 120 provides intelligent control over switch 131. Telephone switch 131 also has an interactive voice response (IVR) capability via an IVR 119.

LAN 118 supports an application server 121 that may be employed for serving voice applications to callers. CTI processor 120 is connected to LAN 118 enabling service to the switch and other maintenance through CTI functionality. LAN 118 supports a messaging server 125 adapted with a physical digital medium containing all of the required software and data to enable function as a message server or router. LAN 118 also supports a statistics server (Stat Server) 126. Stat Server 126 includes a physical non-transitory digital medium comprising all of the software and data required to enable function as a Stat Server. The software of Stat Server 126 is represented as SW 128. Stat server 126 has connection to a data repository 127 adapted to store all call center statistics, including, for example, profiles regarding customers and clients of call center 111, and may also store profiles and statistics regarding agents associated with the call center. Stat Server 126, repository 127 and operating SW 128 is a central focus in an embodiment of the present invention.

Figure 2:
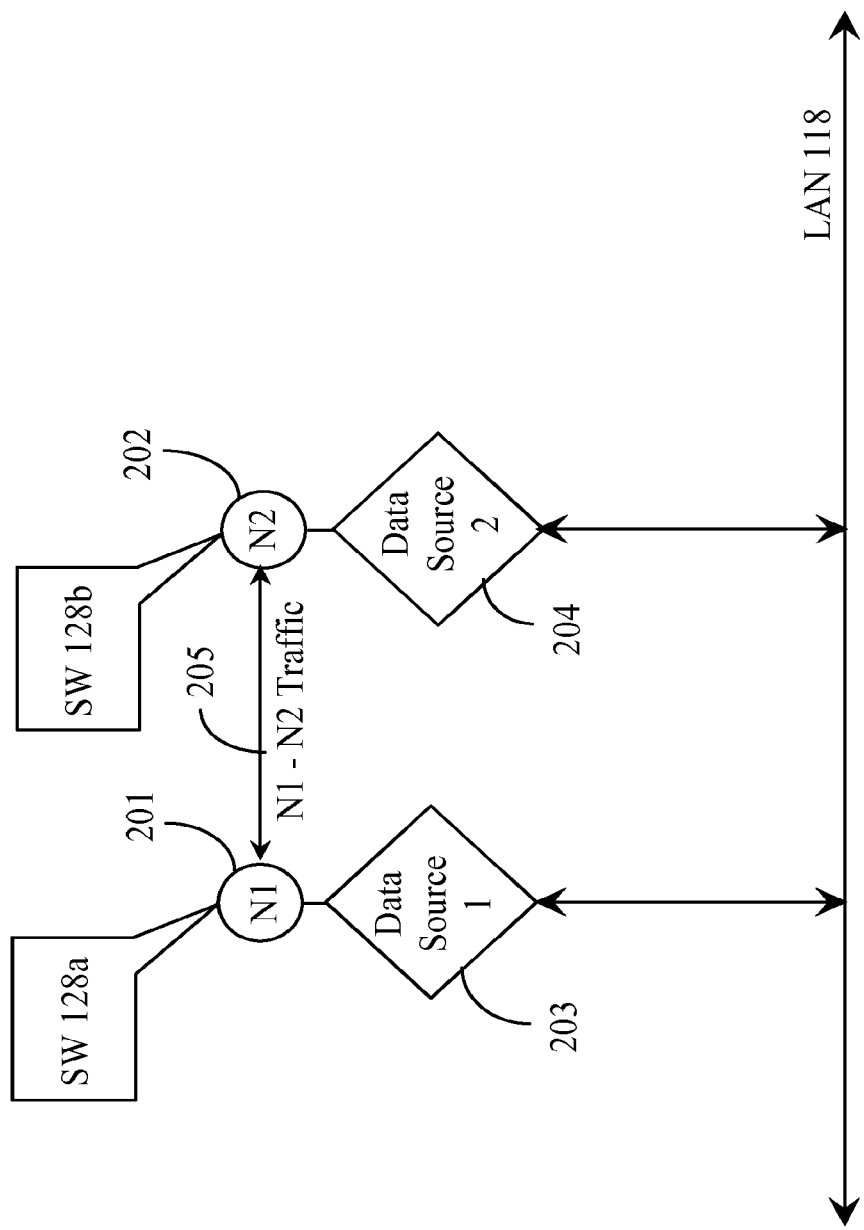
FIG. 2 is a simplified diagram illustrating connectivity of Nodes and Data sources in an embodiment of the present invention.

FIG. 2 is a simplified diagram illustrating connectivity of Nodes and Data sources in an embodiment of the present invention. Node 1 and Node 2 are shown connected by a data link 205, which can be any one of a number of known data paths. Nodes 1 and 2 communicate over this path as needed, but a goal of the present invention is to minimize inter-node traffic in this path. In this example Node 1 connects to a Data Source 1 (203) and Node 2 connects to a Data Source 2 (204), which in turn connect to a data network shown as LAN 118 in this example, but which might be a wide-area network such as the Internet, or another network. Data from the respective Data Sources is operated upon by processing nodes N1 and N2 in embodiments of the present invention, wherein Node 1 executes SW 128*a* and Node 2 executes SW 128*b*. These two software instances are a part of SW 128 indicated in FIG. 1, and may be similar or quite different.

In embodiments of the present invention the call center is partitioned, and objects, such as agents and agent groups, are associated by configuration with one or more nodes. So computations using incoming data to produce statistics regarding one set of agents, for example, may be accomplished by Node 1, and computations regarding another set of agents may be performed by Node 2. Depending upon the sophistication of configuration there may be a great deal of inter-node traffic. If configuration is good there may be moderate inter-node traffic, and if configuration is excellent, there may be very little inter-node traffic. Inter-node traffic is in general undesirable, because it requires time and computing power to accomplish.

In an embodiment of the present invention a simplified model of the contact center is treated, which consists of N agents and M agent-groups. This is simplified because it treats only of agents and agent groups, and the method of the invention is applicable in other embodiments to other objects in the contact center.

It is well known that in a modern call center agents are typically grouped into functional groups. One group, for example, may be dedicated to responding to connections made in outbound campaigns, while another may be dedicated to incoming calls regarding technical support for a particular class of products. Incoming callers may be screened by IVR119 (FIG. 1) and calls routed to agents in particular groups as agents become available according to the callers purpose or need. It is usual for an agent to be a part of more than one group, so the relationship between agents and groups is many-to-many.

Figure 3:
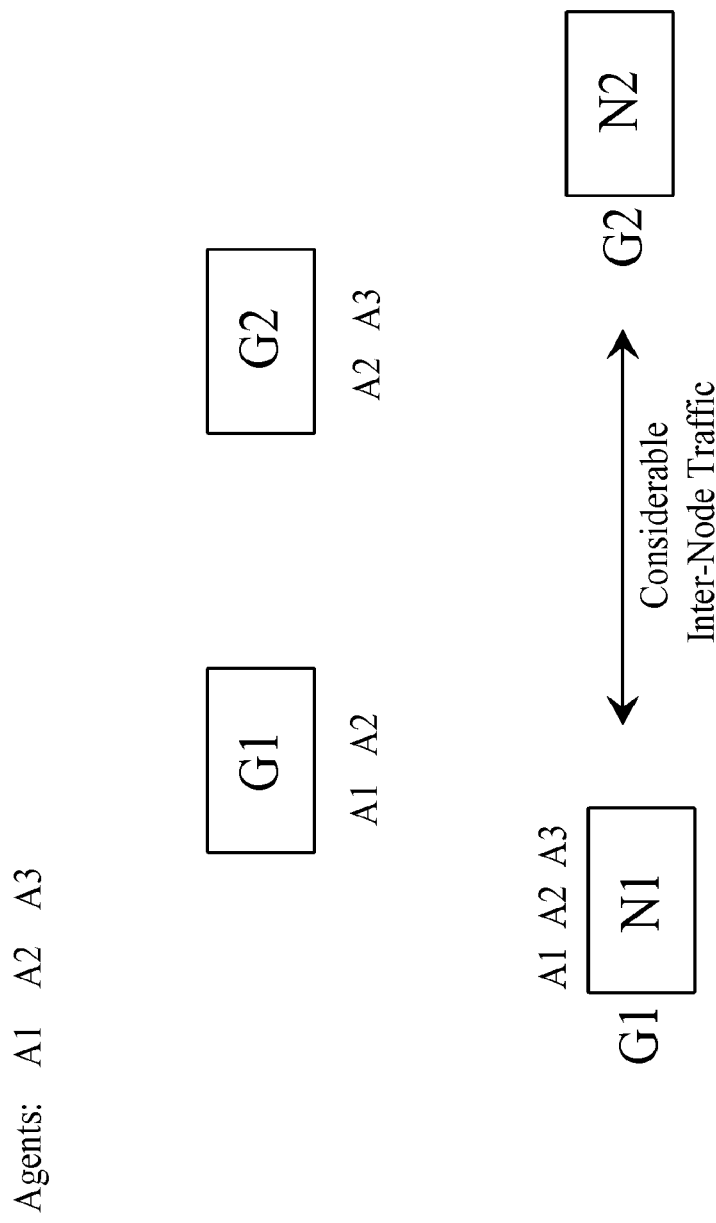
FIG. 3 is represents a simplified case of three agents, two agent groups and two nodes in an embodiment of the invention.

FIG. 3 represents a simplified case of three agents (A1, A2 and A3), two agent groups (G1 and G2) and two nodes N1 and N2. The relationship between agents nodes is typically physical, so all three agents may be associated with N1. In that case N2, processing stats for G2, must collect information regarding all three agents from N1, and inter-node traffic will be considerable.

The skilled artisan will understand that in this architecture there may be hundreds or even thousands of agents, dozens of groups, and a plurality of nodes. The goal is to Partition the call center in such a way to minimize inter-node traffic and provide real-time stats.

In operation there is a set of aggregates $AA\_1, \ldots, AA\_P$ to be computed for each agent, and a set of aggregates $AG\_1, \ldots, AG\_S$ to be computed for each agent-group. It is assumed that at least all agent-group aggregates will be distributive or algebraic, so that it will be possible to efficiently compute the aggregates in the distributed system. More information on this aspect is referenced from [1] J. Han and M. Kamber, "Data Mining: Concepts and Techniques", 2nd ed., Morgan Kaufmann Publishers, March 2006.

If N and M are above a certain threshold it is not computationally feasible to calculate the aggregates in the single node. This is where call center technology has evolved, so it is necessary to partition the contact center. It is desired to spread all agents between K communicating nodes of the distributed system, so that each node performs computations at least approximately the same rate, which will minimize inter-node traffic.

In an embodiment of the present invention the contact center is modeled as a hyper-graph. Hypergraphs are defined generally in the Internet encyclopedia tool Wikipedia (for example, under the Hypergraph article). In an embodiment of the invention each agent is considered a vertex with the unit weight (or more general weight $W=f(complexity(AA\_1), \ldots, complexity(AA\_P))$. An agent-group (Group_i) is considered the hyper-edge (AGENT_i_1, ..., AGENT_i_L).

In terms of hyper-graphs, the problem is the problem of hyper-graph partitioning, described fully in "Multilevel hypergraph partitioning: applications in VLSI domain", by Karypis et. al, March 1999, IEEE Transactions on Very Large Scale Integration (VLSI) Systems 7 (1), pp. 69-79, with cost function awarding equal load distribution and minimizing the inter-node traffic, which can be efficiently solved using existing software packages as may be derived from [4] Zoltan Toolkit, available at the Internet web site for the Sandia National Laboratories Computing Research (for example, under the Zoltan directory).

The two references mentioned above are listed again here:
[1] J. Han and M. Kamber, "Data Mining: Concepts and Techniques", 2nd ed., Morgan Kaufmann Publishers, March 2006
[2] "Multilevel hypergraph partitioning: applications in VLSI domain", by Karypis et. al, March 1999, IEEE Transactions on Very Large Scale Integration (VLSI) Systems 7 (1), pp. 69-79

Both references are incorporated in the instant specification at least by reference. After the Contact Center hypergraph is partitioned, the aggregation is performed as follows.

Each object (agent or group) is mapped to a node using hash function $$H:O \rightarrow [1,K]$$

We call node H(O) an owner for the object O. Each node can easily determine the owner for any object, using this completely decentralized logic. For each agent, the aggregates $AA\_1, \ldots, AA\_P$ are computed in straight-forward manner locally by owner node. The computation of aggregates $AG\_1, \ldots, AG\_S$ for each group Group_i is, in general, shared by all K nodes as follows:

Node i maintains partial state record (PSR) of the aggregate AG_j by aggregating on all agents, owned by node i and belonging to group G. Then, PSR is sent to owner(G), which combines all PSRs into total state record (which is possible because of the aggregates being distributive/algebraic). The traffic minimization embedded into cost function encourages placing all agents of a given group into the same node (partition), so in the ideal case there is almost no inter-node traffic (one node computes the single PSR and sends it to owner node).

Figure 4:
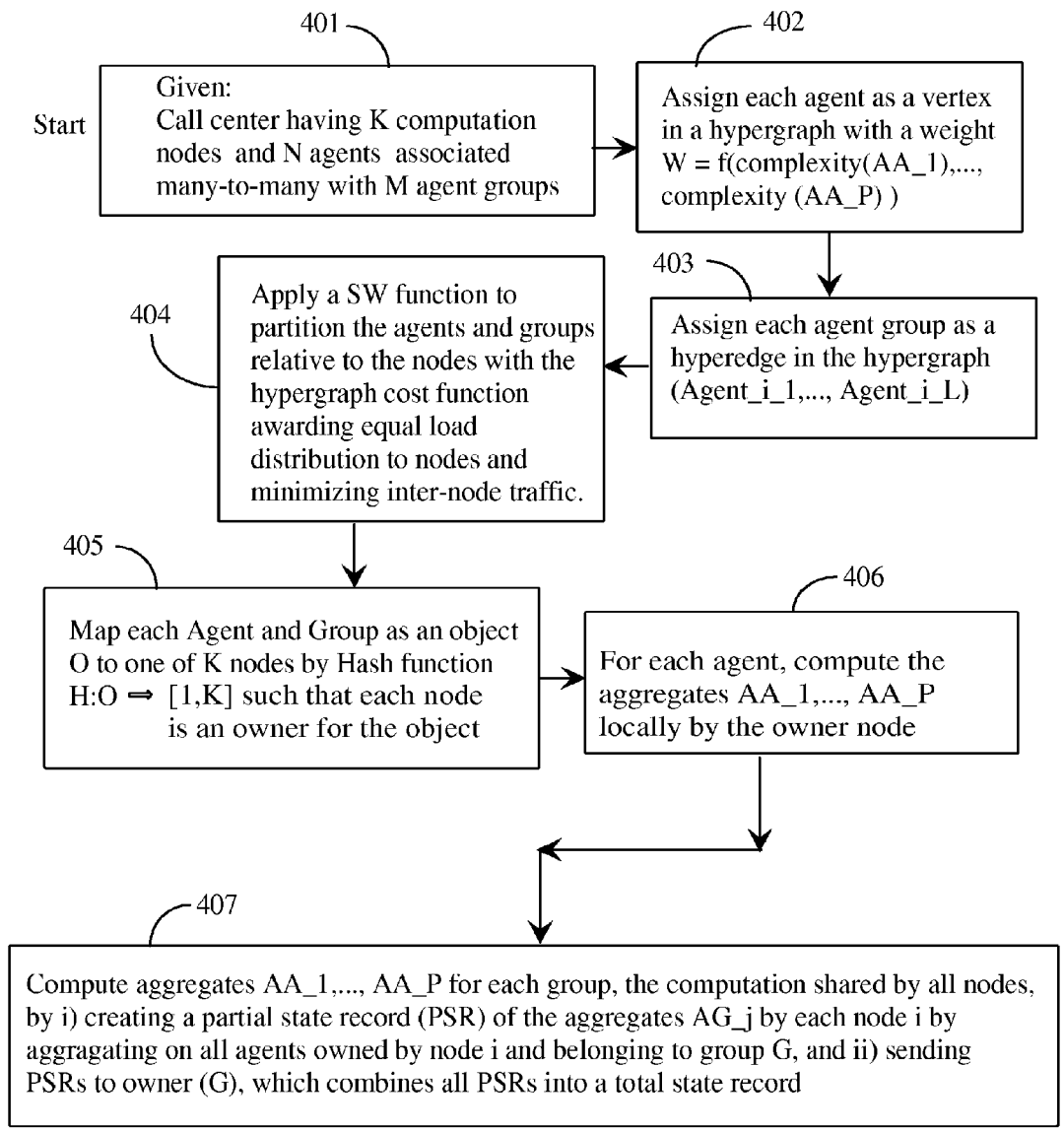
FIG. 4 is a process flow chart illustrating steps in practice of the invention in one embodiment.

FIG. 4 is a process flow chart depicting steps in the procedure in an embodiment of the invention for partitioning a call center using a hypergraph technique. A starting point is illustrated as element 401. At step 402 each agent is assigned as a vertex in a hypergraph with a weight $W=f(complexity(AA\_1), \ldots, complexity(AA\_P))$. At step 403 each agent group is assigned as a hyperedge in the hypergraph (Agent_i_1, ..., Agent_i_L).

At step 404 a software function known for the hypergraph is applied to partition the agents and groups relative to the nodes with the hypergraph cost function awarding equal load distribution to nodes and minimizing inter-node traffic. At step 405 each agent and group is mapped as an object O to one of K nodes by Hash function $H:O \rightarrow [1,K]$, such that each node is an owner for the object. At step 406 aggregates $AA\_1, \ldots, AA\_P$ are computed for each agent locally by the owner node. Finally, at step 407 aggregates $AA\_1, \ldots, AA\_P$ are computed for each group with the computation being shared by all nodes. Each node i creates a partial state record of the aggregates AG_j by aggregating all agents owned by node I and belonging to group G, and sending PSRs to owner (G), which combines all PSRs into a total state record.

It will be apparent to the skilled artisan that the embodiments described are exemplary, and intentionally generalized to avoid undue complication in description. It will also be apparent to the skilled person that many alterations might be made in the embodiments described without departing from the invention, and that would be covered by the claims and enabled by the specification and drawings.

The invention claimed is:

1. A method for partitioning a call center having agents associated with agent groups, for computation by a plurality of computational nodes, comprising:
   (a) assigning, by a processor, the agents as a vertex in a hypergraph;
   (b) assigning, by the processor, the agent groups as a hyper-edge in the hypergraph; and
   (c) applying, by the processor, a hypergraph partitioning algorithm configured to partition the agents and the agent groups relative to the computational nodes with a hypergraph cost function awarding equal load distribution to the computational nodes;
   (d) mapping, by the processor, the agents and the agent groups as an object to one of the computational nodes by a function, such that each computational node is an owner for the object;
   (e) for the agents, computing, by the processor, agent aggregates locally by an associated owner node of the computational nodes; and
   (f) for the agent groups, computing, by the processor, agent group aggregates for each agent group shared by the computational nodes by:
      i) creating a partial state record of the agent group aggregates by each computational node by aggregating on the agents owned by each computational node and belonging to each agent group; and
      ii) sending the partial state records to the owner node, which combines the partial state records into a total state record,
   wherein the partitioning of the call center is for minimizing data traffic between the computational nodes.

2. The method of claim 1, further comprising assigning, by the processor, a weight to each vertex, the vertex corresponding to the agents.

3. The method of claim 2, where the weight is based on a computational complexity of the agent aggregates of the agents.

4. The method of claim 1, further comprising partitioning, by the processor, the hypergraph into partitions corresponding to the computational nodes.

5. The method of claim 4, further comprising using, by the processor, the partitioning to assign each of the agents and the agent groups to a corresponding one of the computational nodes.

6. The method of claim 4, further comprising providing the partitioning in real time.

7. The method of claim 1, where the function comprises a Hash function.

8. The method of claim 1, where a hypergraph cost function minimizes inter-node traffic between the computational nodes.

9. A system for partitioning a call center having agents associated with agent groups, for computation by a plurality of computational nodes, comprising:
   a processor; and
   a non-transitory physical medium, wherein the medium has instructions stored thereon that, when executed by the processor, causes the processor to:
      assign the agents as a vertex in a hypergraph;
      assign the agent groups as a hyper-edge in the hypergraph; and
      apply a hypergraph partitioning algorithm configured to partition the agents and the agent groups relative to the computational nodes with a hypergraph cost function awarding equal load distribution to the computational nodes;
      map the agents and the agent groups as an object to one of the computational nodes by a function, such that each computational node is an owner for the object;
      compute, for the agents, agent aggregates locally by an associated owner node of the computational nodes; and
      compute, for the agent groups, agent group aggregates for each agent group shared by the computational nodes by:
         creating a partial state record of the agent group aggregates by each computational node by aggregating on the agents owned by each computational node and belonging to each agent group; and
         sending the partial state records to the owner node, which combines the partial state records into a total state record,
      wherein the partitioning of the call center is for minimizing data traffic between the computational nodes.

10. The system of claim 9, further comprising assigning, by the processor, a weight to each vertex, the vertex corresponding to the agents.

11. The system of claim 10 where the weight is based on a computational complexity of the agent aggregates of the agents.

12. The system of claim 9, further comprising partitioning, by the processor, the hypergraph into partitions corresponding to the computational nodes.

13. The system of claim 12, further comprising using, by the processor, the partitioning to assign each of the agents and the agent groups to a corresponding one of the computational nodes.

14. The system of claim 12, further comprising providing the partitioning in real time.

15. The system of claim 9, where the function comprises a Hash function.

16. The system of claim 9, where a hypergraph cost function minimizes inter-node traffic.

* * * * *